Feb. 19, 1946.　　　B. G. CARLSON　　　2,395,250
TURN, BANK, AND CLIMB INDICATOR
Filed May 11, 1942　　　3 Sheets-Sheet 1
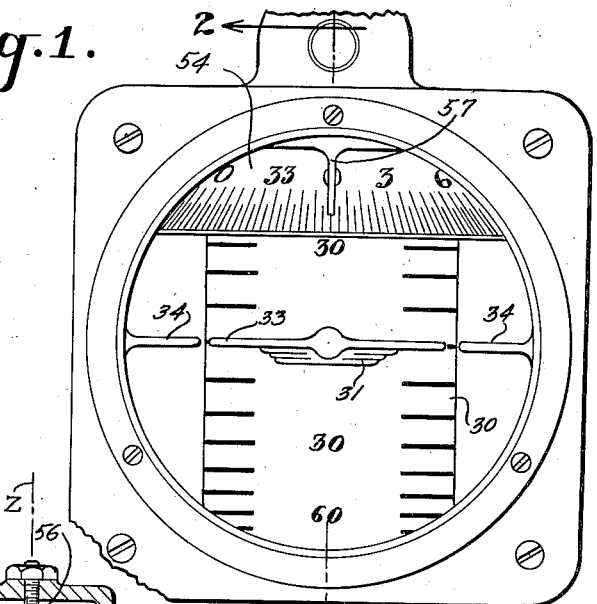
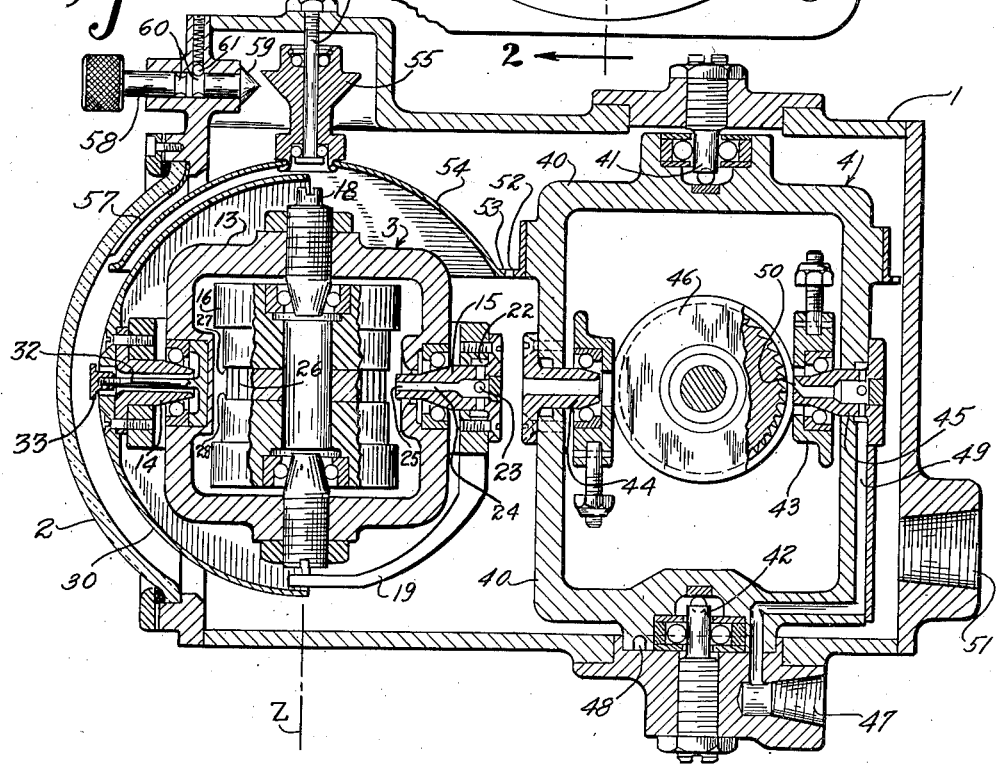
INVENTOR.
BERT G. CARLSON.
BY
Frank H. Harmon
ATTORNEY.

Feb. 19, 1946.  B. G. CARLSON  2,395,250
TURN, BANK, AND CLIMB INDICATOR
Filed May 11, 1942   3 Sheets-Sheet 2

INVENTOR.
BERT G. CARLSON.
BY
Frank H. Harmon
ATTORNEY.

Feb. 19, 1946.   B. G. CARLSON   2,395,250
TURN, BANK, AND CLIMB INDICATOR
Filed May 11, 1942   3 Sheets-Sheet 3

INVENTOR.
BERT G. CARLSON.
BY
Frank H Harmon
ATTORNEY.

Patented Feb. 19, 1946

2,395,250

UNITED STATES PATENT OFFICE 2,395,250

TURN, BANK, AND CLIMB INDICATOR

Bert G. Carlson, Erieside, Ohio, assignor to Jack & Heintz, Inc., Bedford, Ohio, a corporation of Ohio Application May 11, 1942, Serial No. 442,509

19 Claims. (Cl. 33—204)

The invention relates to a flight indicator for aircraft, a primary object of the invention being to provide a single face instrument which is small in size and light in weight to indicate the attitude of an aircraft about its vertical, longitudinal and transverse axes.

Another object of the invention is to provide a combined turn, bank and climb indicator having 360° freedom in its turn and climb indicating elements.

Another object is to provide a device of the type described which is of simple and rugged construction involving relatively few parts in comparison with known devices for accomplishing the same functions.

A further object is to provide an improved horizon gyro which will automatically seek and tend to maintain a vertical position without the use of accessory devices.

A still further object is to provide a novel method for automatically erecting an horizon gyro.

These and other objects will become apparent to those skilled in the art as the description proceeds in connection with the accompanying drawings illustrating a preferred embodiment.

Figure 1 is a front elevation view of the preferred embodiment of the invention as it appears to the pilot when installed on the instrument panel of an aircraft or the like.

Figure 2 is a longitudinal sectional view, being taken on the line 2—2 of Figure 1.

Figure 3:
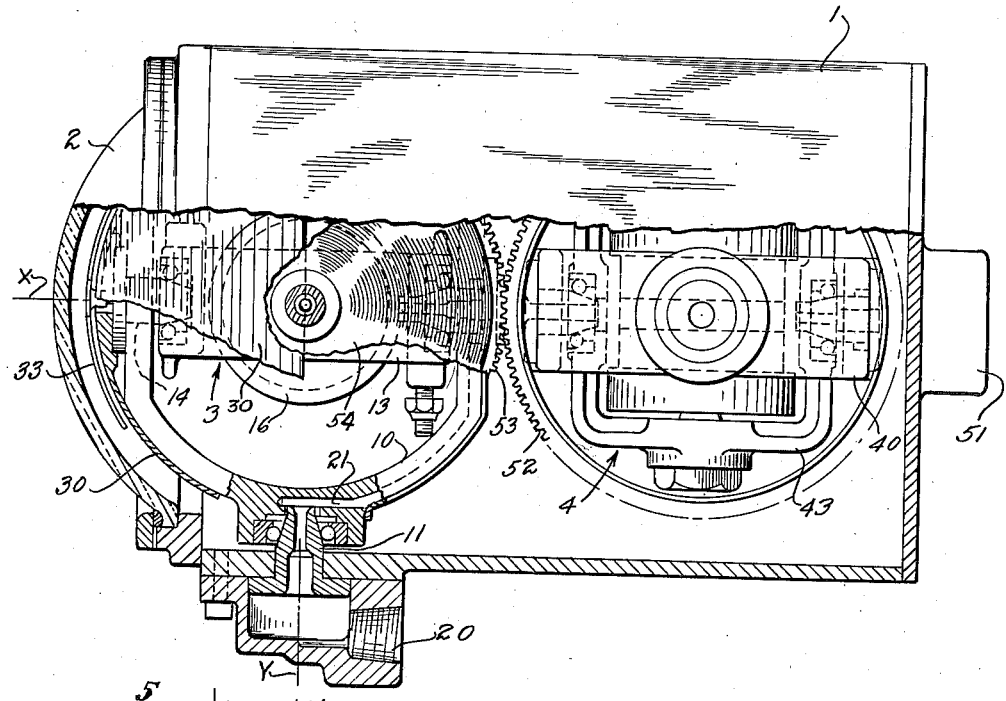
Figure 3 is a top view in which the casing and certain parts are broken away to reveal other parts.
Figure 4:
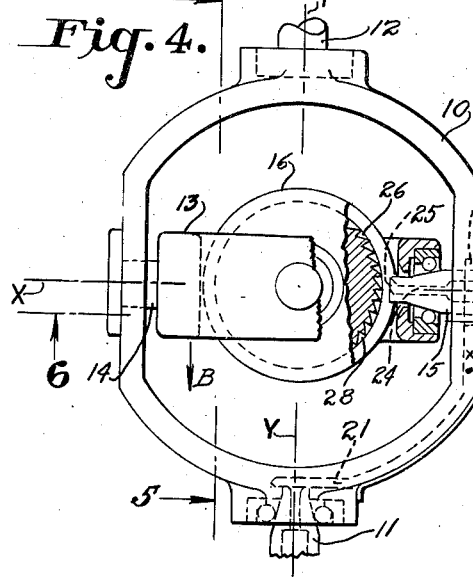
Figure 5:
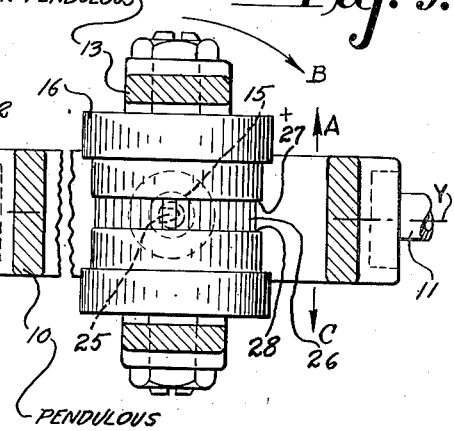
Figure 6:
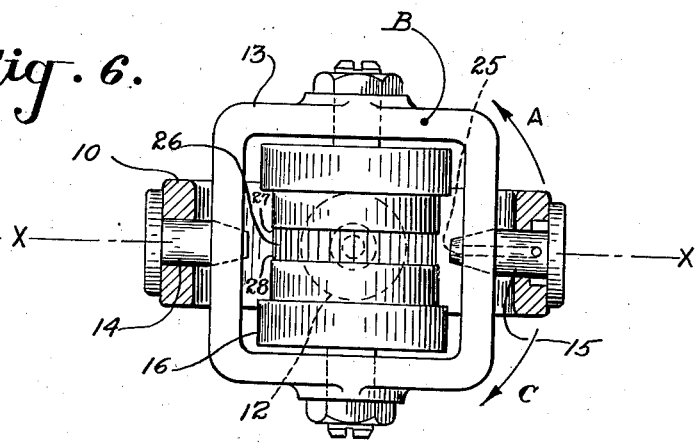

Figures 4, 5 and 6 illustrate diagrammatically the method of erecting the gyro, Figure 4 being a plan view of an elemental horizon gyro, and Figures 5 and 6 being taken on the lines 5—5 and 6—6, respectively, of Figure 4.

Figure 7:
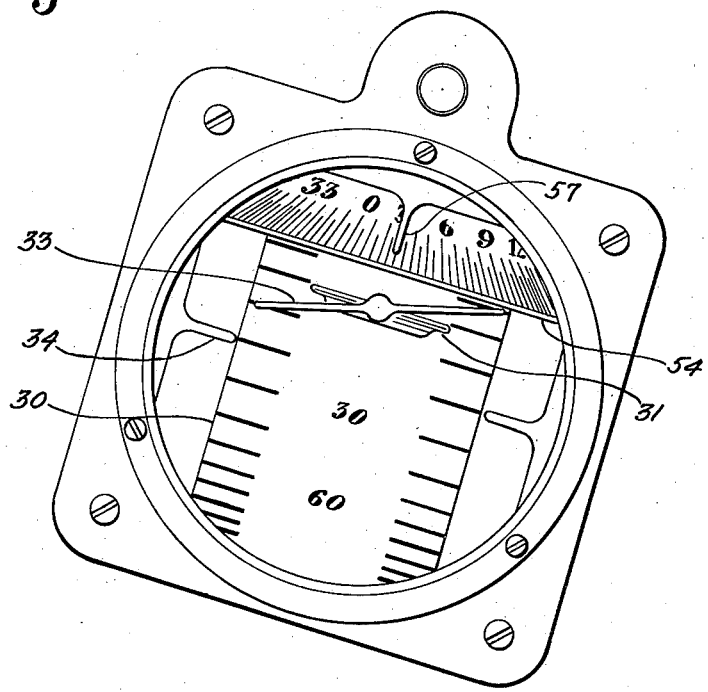

Figure 7 is a view of the face of the instrument to show the manner of indicating a particular attitude of the aircraft.

The present instrument combines the functions of the customary directional gyro and horizon gyro, and makes their combined indications visible in a single face on the instrument panel. The casing 1, provided with a window 2, contains an horizon gyro, indicated generally at 3, and a directional gyro, indicated generally at 4.

The horizon gyro 3 comprises an outer gimbal ring 10 pivoted on trunnions 11, 12 on a normally horizontal axis Y, transverse to the longitudinal axis of the aircraft and to the line of flight. An inner gimbal ring 13 constituting a rotor bearing frame is pivoted on trunnions 14, 15 on an axis X, parallel with the longitudinal axis of the aircraft and the line of flight. The inner gimbal ring 13 carries an air spun rotor 16 having a normally vertical spin axis Z. The inner gimbal ring 13 is made non-pendulous on the trunnions 14, 15, and is capable of approximately 340° freedom on said trunnions. In the present embodiment a projection 18 acts as a stop and is arranged to engage a freedom limiting arm 19 on the outer gimbal ring 10 to provide the stated degree of freedom and prevent upsetting of the rotor. The arm 19 insures that the rotor axis will return to its original position after maneuvers. The outer gimbal ring 10 is made pendulous in the trunnions 11, 12, the arm 19 providing a convenient source of unbalanced weight to supply such pendulousness. The eccentric weight of the arm 19 may be compensated in part, or augmented, as desired, by appropriately positioning the bearings in the gimbal ring 10 which turn upon the trunnions 11, 12.

In the present embodiment the rotor 16 is driven by an air jet supplied through a fitting 20 in communication with a passageway in the trunnion 11. The inner end of the trunnion 11 is in turn in communication with an air passage 21 in the gimbal ring 10 leading to an annular passage 22 surrounding apertures 23 in the trunnion 15. A longitudinal passage 24 conveys the air to one or more nozzles 25 for driving the rotor. The rotor 16 is provided with buckets 26 distributed around its periphery in the manner shown, said buckets having end walls 27, 28 closing the end portions thereof. Each of the end walls 27 and 28 may lie in a plane normal to the rotor axis or it may be merely a curved surface continuing the wall of the bucket at a gradually decreasing depth until it intersects the outer surface of the rotor. In either event the lateral side portions of the buckets are capable of producing a turning moment about the outer gimbal ring axis Y, from the reaction of jet components parallel to the rotor axis whenever the gimbal ring 13 becomes inclined with respect to the nozzle 25 which is fixed with respect to the outer gimbal ring 10. By choosing the proper direction of spin for the rotor 16, precession from such turning moment about the Y axis will cause the inner, non-pendulous, gimbal ring 13 to be self-erecting within the outer ring.

The outer gimbal ring 10 carries a spherically curved climb indicator card 30 preferably hemispherical in extent and approximately concentric with the curvature of the window or face 2. This card may be provided with the customary markings to indicate the angle of climbing or diving, the representation 31 of the airplane constituting the zero point in the vertical scale.

The trunnion 14 is hollow, and extending therethrough is a shaft or stem 32 bearing a bank indicator bar 33 carried by the inner gimbal ring 13. Level lines 34 may be provided on or behind the face 22 in the customary manner so that in level straight forward flight the zero mark 31 and the bank indicator 33 will both line up with the level lines 34. As the aircraft climbs or dives, the climb indicator card 30 will appear to rotate either up or down in the window 2, and as the aircraft banks the bank indicator bar 33 will appear to rotate with respect to the card 30 and the marking 31 to visually indicate the angle of bank. From the foregoing description it will be apparent that the climb indicator is capable of 360° freedom so that the aircraft may make a complete loop around the stationary card 30 without interfering with the gyroscope. In a bank or roll the aircraft may rotate about its longitudinal axis until the freedom limiting arm 19 engages the stop 18 which preferably allows 170° freedom left or right. The arm 19 thereby insures the return of the indicating elements to their original positions in the window 2 after maneuvers which may have tended to reverse or invert the parts.

The directional gyro 4 comprises an outer gimbal ring 40 mounted on trunnions 41, 42, and an inner gimbal ring 43 mounted on trunnions 44, 45. The inner gimbal ring 43 carries the conventional air spun rotor 46. Air supply for the directional gyroscope is admitted through an external fitting 47 in communication with an annular passage 48 connected in turn with a passage 49 on the outer gimbal ring 40. The trunnion 45 is hollow and is provided with a rotor driving air jet nozzle 50 in a manner similar to the hollow trunnion 15 previously described. A fitting 51 provides for withdrawing the air from the casing 1 admitted by both of the inlet fittings 20 and 47.

The outer gimbal ring 40 of the directional gyro is provided with a gear tooth driving ring 52 for engaging a co-mating rim 53 on a compass card 54. Compass card 54 has a spherical curvature concentric with the climb indicator card 30 and the window 2, in the relation shown. A conical member 55 supports the compass card 54 for limited axial movement and unlimited rotational movement upon a vertical shaft 56 fixed on the top wall of the casing 1. Thus the rim 53 of the compass card normally rests in rotational engagement with the driving ring 52 and is driven thereby to indicate the course or azimuth of the aircraft as the latter turns about the directional gyro 4. The numeral 57 refers to a lubber line behind the window 2 and in front of the compass card 54. The front of the casing 1 carries a short shaft 58 having a conical surface 59 on its inner end closely adjacent the conical element 55 so that when the shaft 58 is pressed inwardly, and rotated, the surface 59 will cam up the conical member 55 and rotate the latter, whereby the rim 53 is disengaged from the driving ring 52 to free the compass card for manual setting to a desired course. When the conical tip 59 is withdrawn from the cone 55 the compass card 54 will descend on the shaft 56 until the rim 53 drops into engagement with the driving ring 52. Grooves 60 may be provided in the shaft 58 for cooperation with a click detent 61 to hold the shaft 58 in either its in or out position.

Figure 7 shows the face of the instrument as it appears during a climbing turn to the right, the aircraft having already turned 30° off course. The attitude of the ship with respect to all three axes is readily apparent on the single face 2.

The application of the principles of the present invention involves a novel method for erecting and maintaining erect a horizon gyroscope having a normally vertical spin axis. The method will now be described in connection with Figures 4, 5 and 6 wherein applicant's horizon gyroscope is illustrated in simplified form, the corresponding parts being numbered in accordance with the previously described figures in the drawings. The outer ring 10 is pendulous about the Y axis on the trunnions 11, 12, and the inner ring 13 is nonpendulously pivoted on the X axis on the trunnions 14, 15. Wander is thereby effectively prevented in the outer gimbal ring by the pendulousness thereof. Should the inner gimbal ring 13 tend to wander upon its trunnions 14, 15, the inclination of the buckets 26 with respect to the air jet nozzle 25, which is fixed in the outer gimbal ring 10, will create a vertical air jet reaction component producing a torque or moment about the Y axis in opposition to the effect of gravity upon the pendulousness of the outer gimbal ring. Any such tilting moment on the outer gimbal ring automatically precesses the inner gimbal ring 13 to right the rotor and maintain it so. In practice, the precession forces operate to effectively prevent wander before the amount is appreciable, thereby producing an inherently stable system. For instance, if the inner gimbal ring 13 tends to wander in the direction of the arrow B, the air jet reaction on the end walls 28 of the buckets will produce a tilting moment on the outer gimbal ring 10 in the direction of the arrow C. Precession from this moment will tend to rotate the inner gimbal ring 13 in a direction counter to the arrow B in an amount sufficient to correct for the drift.

With regard to acceleration forces, it is seen that the inner gimbal ring 13, being nonpendulous, will not be affected thereby. The axis X, of the inner gimbal ring is therefore made parallel with the longitudinal axis of the aircraft and at right angles to the directions of those horizontal accelerations capable of long duration such as centrifugal force in turning. Turns, regardless of their duration, accordingly have no disturbing effect upon the gyro.

The only possible response of the horizon gyro of the present invention to horizontal acceleration forces is by reason of the pendulousness of the outer gimbal ring, and the axis of this gimbal ring is therefore oriented transversely of the aircraft so as to be affected only by fore and aft accelerations which are necessarily of short duration and are usually relatively small in value. The novel arrangement of the present construction, however, effectively compensates to prevent tilting of the pendulous gimbal ring in response to those accelerations which may affect it. Assuming that the aircraft undergoes an acceleration tending to tilt the outer gimbal ring in the direction of the arrow A, the direction of rotation of the rotor 16 is such that the inner gimbal ring 13 will precess in the direction of the arrow B thereby tilting the rotor with respect to the nozzle 25. The tilted positions of the buckets 26 will then produce air jet reactions on the end walls 28 resulting in a corrective moment about the Y axis of the outer gimbal ring in the direction of the arrow C. The precession of the inner gimbal ring 13, just referred to, will be such that the force C is sufficient to balance the force A and thereby prevent actual movement or tilting of the outer gimbal ring on its trunnions.

In the light of the foregoing description it will be appreciated that the present horizon gyro is free of the common tendency to wander and that it maintains itself erect and undisturbed by horizontal acceleration forces as encountered in aircraft use. The method of the invention involves the application of a novel combination of gravity and air jet reaction forces to maintain the spin axis erect under various disturbing conditions. In general, the method comprises applying gravitational forces to the outer gimbal ring to resist creep or drift thereof, and applying air jet reaction forces to the rotor in combination with said gravitational forces to create precession forces resisting creep in the inner gimbal ring and acceleration response in the outer ring. The present method is of especial utility and advantage since it does not require auxiliary devices such as additional air jets, pendulous shutter blades, and the like, involving added weight and moving parts. The invention is, of course, capable of various modifications. While it is intended to use the various features and elements in the combination and relations described, some of these may be altered and others omitted without interfering with the general results outlined, and the invention includes such use. The apparatus shown and described is intended to represent the best embodiment of the invention, but it is understood to be illustrative only, the invention being limited only by the prior art and the scope of the appended claims.

The terms "vertical" and "horizontal" are used herein to mean approximately, or normally, vertical or horizontal, and are not to be construed in the strict sense. For instance, references to a vertical spin axis are to be construed only as meaning approximately vertical, and references to horizontal gimbal axes mean normally horizontal, since, of course, the axis of the outer gimbal ring is fixed in the aircraft.

I claim:

1. A flight indicator comprising a spherically curved compass card mounted for 360° freedom on a vertical axis, a spherically curved climb indicator card mounted for 360° freedom on a horizontal axis and concentrically disposed partially within said compass card, and a bank indicator bar pivotally mounted on said climb indicator card and movable therewith.

2. A flight indicator comprising an horizon gyro mounted on inner and outer gimbal rings, a spherically curved climb indicator card carried by said outer gimbal ring, a bank indicator bar on said card and pivoted with said inner gimbal ring, and a compass card overlying a portion of said climb indicator card and curved concentrically therewith to give a complete indication of the attitude of flight.

3. A flight indicator comprising a casing, a spherically curved window in said casing, horizon and directional gyros in side-by-side relation in said casing, a spherically curved climb indicator card in said window and operable by said horizon gyro, a bank indicator bar pivoted on said card and also operable by said horizon gyro, a spherically curved compass card overlying a portion of said climb indicator card and concentric therewith, means on said directional gyro for rotating said compass card, and means for disengaging said means and independently rotating said compass card to set the latter on a selected course.

4. A flight indicator comprising a casing, a spherically curved window in said casing, horizon and directional gyros in side-by-side relation in said casing, a spherically curved climb indicator card in said window and operable by said horizon gyro, a bank indicator bar pivoted on said card and also operable by said horizon gyro, a spherically curved compass card overlying a portion of said climb indicator card and concentric therewith, said compass card being mounted for rotation and axial movement upon a vertical shaft above said horizon gyro, said compass card normally resting in a lower position on said shaft so as to be in driving engagement with said directional gyro, and means for raising said compass card out of said driving engagement for independently rotating said card to a selected course.

5. In a flight indicator, a casing, a window in said casing, a horizon gyro in said window, a directional gyro adjacent said horizon gyro, said horizon gyro having an outer gimbal ring pivoted on an axis transverse to the line of flight and an inner gimbal ring pivoted on an axis parallel with the line of flight, a spherically curved climb indicator carried by said outer gimbal ring, a bank indicator carried by said inner gimbal ring, a vertical shaft in said casing immediately above said horizon gyro, a spherically curved compass card mounted for axial and rotational movement on said shaft and adapted to normally engage said directional gyro for operation thereby in concentric relation with said climb indicator, and a manipulable member carried by said casing for raising said compass card from engagement with said directional gyro and for independently rotating said card to a selected course.

6. A flight indicator comprising a casing, a spherically curved window in said casing, horizon and directional gyros in side-by-side relation in said casing, a spherically curved climb indicator card in said window and operable by said horizon gyro, a bank indicator bar pivoted on said card and also operable by said horizon gyro, a spherically curved compass card overlying a portion of said climb indicator card and concentric therewith, said compass card being mounted for rotation and axial movement upon a vertical shaft above said horizon gyro, said compass card normally resting in a lower position on said shaft so as to be in driving engagement with said directional gyro, and means for raising said compass card out of said driving engagement for independently rotating said card to a selected course, said means comprising a rotatable and axially movable member at right angles to said shaft, and conical elements on said card and said member whereby axial movement of said member toward said shaft engages said conical elements to raise said compass card to break said driving engagement and establish a driving engagement with said member, said directional gyro being at all times free of the weight of said compass card.

7. A self erecting horizon gyro for aircraft comprising a pendulous outer gimbal ring pivoted for 360° freedom, a non-pendulous inner gimbal ring pivoted on a pair of hollow trunnions carried by said outer ring, a freedom limiting arm on said outer ring to limit the freedom of said inner ring to approximately 340°, a single gyro rotor in said inner ring, one of said hollow trunnions constituting a rotor driving nozzle capable of erecting said rotor, a bank indicator having means of attachment to said inner ring extending through the other hollow trunnion, and a climb indicator card carried by said outer gimbal ring and forming a background for said bank indicator.

8. A self erecting horizon gyro for aircraft comprising a pendulous outer gimbal ring pivoted for 360° freedom on a horizontal axis transverse to the longitudinal axis of the aircraft, a non-pendulous inner gimbal ring pivoted in said outer ring for approximately 340° freedom about an axis parallel with the longitudinal axis of the aircraft, a single air spun gyro rotor in said inner ring, a rotor spinning nozzle carried by said outer gimbal ring, a bank indicator attached to said inner gimbal, and a climb indicator card attached to said outer gimbal and forming a background for said bank indicator, said outer gimbal being erected by pendulousness and the inner gimbal being erected by the rotor spinning air jet.

9. A self erecting horizon gyro for aircraft comprising a pendulous outer gimbal ring pivoted for 360° freedom on a horizontal axis transverse to the line of flight, a non-pendulous inner gimbal ring pivoted for approximately 340° freedom in said outer ring on a horizontal axis parallel to the line of flight, a single air driven rotor having a normally vertical spin axis carried in said inner gimbal ring, and an air jet nozzle carried by said outer ring for driving said rotor, said rotor driving jet being effective to erect said rotor in said outer ring.

10. A self erecting horizon gyro for aircraft comprising a pendulous outer gimbal ring, a non-pendulous inner gimbal ring carried on pivot means for approximately 340° freedom in said outer ring, and a single air driven rotor having a normally vertical spin axis carried in said inner gimbal ring, one of said pivot means comprising a trunnion integral with said outer ring, said trunnion constituting a rotor driving air jet nozzle adapted to discharge a compact stream of air on said rotor to erect said rotor in said outer ring.

11. A self erecting horizon gyro for aircraft comprising a pendulous outer gimbal ring pivoted on an axis transverse to the longitudinal axis of the aircraft, a non-pendulous inner gimbal ring carried by said outer ring on pivot means on an axis parallel to the longitudinal axis of the aircraft, an air driven rotor having a normally vertical spin axis carried in said inner gimbal ring, said pivot means comprising hollow trunnions in said outer gimbal ring for supporting said inner gimbal ring, an air jet nozzle in one of said trunnions for driving said rotor, a stem on said inner gimbal ring extending through the other trunnion and carrying an artificial horizon bar, and a climb indicator carried by said outer gimbal ring.

12. In a flight indicator having a spherically curved climb indicator card pivotally mounted on a horizontal axis and having a bank indicator bar pivotally mounted thereon, a spherically curved compass card mounted on a vertical axis so as to be disposed concentrically with and partially enclosing said climb indicator card in the same field of view for conjoint movement therewith in response to movements of the aircraft on which the flight indicator is mounted.

13. In a gyro horizon indicator having a spherically curved window with a horizontally pivoted spherically curved climb indicator card mounted in said window and having a bank indicator pivotally mounted thereon, a vertically pivoted spherically curved compass card disposed in concentric relation with said climb indicator card in said window and partially enclosing said climb indicator card for conjoint movement therewith in response to movements of the aircraft on which the flight indicator is mounted.

14. In a gyro horizon indicator having a spherically curved bank indicator card at least partially surrounding a gyro vertical assembly and carrying a bank indicator pivotally mounted thereon, a vertically pivoted spherically curved compass card partially covering said climb indicator card in concentric relation therewith, and a directional gyro for driving said compass card in the same field of view with said climb indicator card for conjoint movement therewith in response to movements of the aircraft on which the indicator is mounted.

15. An aircraft flight instrument comprising a vertically pivoted spherically curved rotatable compass card, means for driving said card in designation of direction in azimuth, a spherically curved horizontally pivoted climb indicator card having a bank indicator bar pivoted thereon to simulate the horizon, said indicator card and bar being cooperatively disposed in the same field of view as said compass card and being operable in response to the climb, bank and turn of an aircraft, respectively, whereby relative movement of said cards and said bar in said field of view indicates conditions of climb, bank and turn of the supporting aircraft.

16. In an aircraft flight instrument, the combination of a housing having a masked face provided with a circular spherically curved transparent window provided with fixed level reference indices, a vertically pivoted spherically curved compass card rotatably supported in the housing behind and substantially aligned with the pivot point of the radius generating said spherically curved window whereby said card will rotate in visual relation with said window, means for actuating said card responsive to turn of an aircraft, said card having indicia thereon designating the course of the aircraft, a horizontally pivoted spherically curved climb indicator card having a bank indicator bar pivoted thereon, said climb indicator card and bank indicator bar moving in correlated view with said compass card, whereby said climb indicator card forms a background for said bank indicator bar and said level indicators, and means carried within said housing for actuating said climb indicator card and said bank indicator bar responsive to the climb and bank of an aircraft.

17. In an aircraft flight instrument, the combination of a housing having a masked face provided with a substantially circular and spherically curved window having horizontal level reference indices, a spherically curved course indicating compass card rotatably supported on a vertical pivot in the housing behind and in substantial alignment with the pivot point of the radius generating said spherical window whereby a segment of said card will rotate in visual relation with said window, means for actuating said card responsive to turn of an aircraft, said card having indicia thereon designating the course of said aircraft, a spherically curved climb indicator card movably supported in the housing in correlated view with said compass card, means carried within the housing for actuating said climb indicator card responsive to the climb of an aircraft, and a bank indicator bar pivotally mounted on said climb indicator card as a background and movable in said window in correlated field of view therewith and with said compass card whereby the relative positions and movements of said three indicating elements provides a unitary indication simulating the exact attitude of an aircraft upon which the instrument is mounted.

18. In a flight indicator for aircraft, the combination of a spherically shaped compass card rotatable about a vertical axis, means responsive to turning of the aircraft for rotating the visible portion of said card from right to left for a right turn and from left to right for a left turn, a spherically shaped horizontally pivoted climb indicator card, means for actuating said card to move it relatively upward to indicate a climbing attitude of the aircraft and to move it relatively downward to indicate a pitching attitude of the aircraft, an indicating marking on said climb indicator card simulating an aircraft and adapted to bank with said aircraft, a bank indicator bar pivotally mounted on said climb indicator card and adapted to move angularly on said pivot in response to the bank of the craft to maintain a parallel relation with the earth's horizon so that its position with respect to said aircraft simulating marking corresponds exactly to the bank of the aircraft, said compass card, said climb indicator card and said bank indicator bar providing by their conjoint movement a unitary indication portraying the exact attitude and movement of the aircraft.

19. In a flight indicator, the combination of a turn indicator comprising a spherically shaped compass card rotatable on a vertical pivot, a directional gyroscope for controlling the actuation of said turn indicator, a pitch and climb indicator comprising a climb indicator card having an aircraft simulating marking thereon and adapted to move upward and downward whereby its relative movement corresponds to climb and pitch of the aircraft, a bank indicator comprising a bank indicator bar pivotally mounted on said climb indicator card and superimposed over said aircraft simulating marking whereby said marking and said climb indicator card form a background for said bank indicator, said bank indicator bar being movable with respect to said climb indicator card to indicate left and right bank, means for actuating the bank indicator, and means for actuating the climb indicator card; the turn indicator, climb indicator and bank indicator providing a unitary indication and being arranged in such a manner that a right to left movement of said turn indicator gives an indication of a right turn and vice versa, all of said indicator elements being operable simultaneously when the aircraft upon which the flight indicator is mounted turns, banks and climbs, or pitches, whereby the relative positions and movements of the three indicator elements with respect to each other are such as to indicate the attitude and movement of the aircraft on which the flight indicator is mounted.

BERT G. CARLSON.